United States Patent
Rajpathak et al.

(10) Patent No.: US 10,482,178 B2
(45) Date of Patent: Nov. 19, 2019

(54) SEMANTIC SIMILARITY ANALYSIS TO DETERMINE RELATEDNESS OF HETEROGENEOUS DATA

(71) Applicant: GM Global Technology Operations LLC, Detroit, MI (US)

(72) Inventors: Dnyanesh G. Rajpathak, Troy, MI (US); John A. Cafeo, Farmington, MI (US); Baiyang Wang, Evanston, IL (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 205 days.

(21) Appl. No.: 15/672,643

(22) Filed: Aug. 9, 2017

(65) Prior Publication Data
US 2019/0050394 A1 Feb. 14, 2019

(51) Int. Cl.
G06F 16/28 (2019.01)
G06F 17/27 (2006.01)
G06F 16/93 (2019.01)

(52) U.S. Cl.
CPC ........ *G06F 17/2785* (2013.01); *G06F 16/285* (2019.01); *G06F 16/93* (2019.01)

(58) Field of Classification Search
CPC .................................................... G06F 16/285
See application file for complete search history.

(56) References Cited

U.S. PATENT DOCUMENTS

2016/0162574 A1* 6/2016 Gorodilov .............. G06Q 10/10
707/722

* cited by examiner

*Primary Examiner* — Kris E Mackes
(74) *Attorney, Agent, or Firm* — Cantor Colburn LLP

(57) ABSTRACT

A method and system to determine relatedness select a first customer observable from a first source document, the first customer observable being made up of two terms, the two terms being a first term of a first type and a first term of a second type, and select a second customer observable from a second source document, the second customer observable being made up of a second term of the first type and a second term of the second type. The method includes creating a first corpus of all documents that include the first terms, creating a second corpus of all documents that include the second terms, obtaining other first terms in the first corpus and other second in the second corpus, and performing semantic similarity analysis to determine a similarity score between the first customer observable and the second customer observable.

20 Claims, 5 Drawing Sheets

SEMANTIC SIMILARITY ANALYSIS TO DETERMINE RELATEDNESS OF HETEROGENEOUS DATA

INTRODUCTION

The subject disclosure relates to semantic similarity analysis to link heterogeneous data.

Information relating to the same topic can be discussed in several forums in different ways. For example, discussion of issues encountered with a computer system or vehicle may be discussed by customers in communication with service providers, in public social media posts on the internet, and among technicians and maintenance professionals. The fault codes issued by the equipment itself may be another source of information. Recognizing the various discussion as relating to the same issue can be advantageous. For example, a manufacturer may recognize an issue as a potential fault rather than an anomaly more quickly based on the various discussions. The most effective fix for a problem may be determined based on the various discussions, as another example. A large volume of information from multiple heterogeneous sources makes the identification of similarities in the discussed issues challenging. Accordingly, it is desirable to provide semantic similarity analysis to link heterogeneous data.

SUMMARY

In one exemplary embodiment, a method of determining relatedness of heterogeneous data includes selecting a first customer observable from a first source document, the first customer observable being made up of two terms, the two terms being a first term of a first type and a first term of a second type, and selecting a second customer observable from a second source document, the second customer observable being made up of a second term of the first type and a second term of the second type. The method also includes creating a first corpus of all documents that include the first term of the first type and the first term of the second type, creating a second corpus of all documents that include the second term of the first type and the second term of the second type, and obtaining other first terms of the first type and other first terms of the second type in the first corpus and other second terms of the first type and other second terms of the second type in the second corpus. Semantic similarity analysis is performed using the first term, the other first terms, the second term, and the other second terms of the first type and the first term, the other first terms, the second term, and the other second terms of the second type to determine a similarity score between the first customer observable and the second customer observable.

In addition to one or more of the features described herein, a first filter is applied to the first term of the first type, the other first terms of the first type, the first term of the second type, the other first terms of the second type, the second term of the first type, the other second terms of the first type, the second term of the second type, and the other second terms of the second type prior to the performing the semantic similarity analysis.

In addition to one or more of the features described herein, a first vector is formed that includes the first term of the first type, the other first terms of the first type, the first term of the second type, and the other first terms of the second type, and forming a second vector that includes the second term of the first type, the other second terms of the first type, the second term of the second type, and the other second terms of the second type.

In addition to one or more of the features described herein, a first matrix is formed from the first vector and forming a second matrix from the second vector.

In addition to one or more of the features described herein, a co-occurrenceindex value is obtained for each of the first term of the first type and the other first terms of the first type with every one of the first term of the second type and the other first terms of the second type, and a co-occurrence index value is obtained for each of the second term of the first type and the other second terms of the first types with every one of the second term of the second type and the other second terms of the second type.

In addition to one or more of the features described herein, the co-occurrence index values are obtained by performing computations based on occurrences of the first term of the first type, the other first terms of the first type, the first term of the second type, and the other first terms of the second type in the first corpus, and occurrences of the second term of the first type, the other second terms of the first type, the second term of the second type, and the other second terms of the second type in the second corpus.

In addition to one or more of the features described herein, a term frequency (tf) and inverse document frequency (idf) of some or all elements of the first vector and some or all elements of the second vector are determined.

In addition to one or more of the features described herein, the tf for a term, the term being one of the first term of the first type, the other first terms of the first type, the first term of the second type, the other first terms of the second type, the second term of the first type, the other second terms of the first type, the second term of the second type, or the other second terms of the second type, is determined as a total number of mentions of the term in the first corpus based on the term being one of the first term of the first type, the other first terms of the first type, the first term of the second type, or the other first terms of the second type and in the second corpus based on the term being one of the second term of the first type, the other second terms of the first type, the second term of the second type, or the other second terms of the second type, and the idf for the term is determined by adding a nominal value to a computation based on a number of documents in which the term is mentioned.

In addition to one or more of the features described herein, the similarity score is determined by computing a cosine similarity or computing a Kullback-Leibler (KL) Divergence using a product of the tf and the idf In addition to one or more of the features described herein, the relatedness determination is performed iteratively by selecting a different second customer observable in each iteration.

In another exemplary embodiment, a system to determine relatedness of heterogeneous data includes a memory device to store a first corpus of all documents that include a first term of a first type and a first term of a second type and to store a second corpus of all documents that include a second term of the first type and a second term of the second type. The first term of the first type and the first term of the second type comprise a first customer observable, and the second term of the first type and the second term of the second type comprise a second customer observable. A processor identifies other first terms of the first type and other first terms of the second type in the first corpus, identifies other terms of the first type and other second terms of the second type in the second corpus, and performs semantic similarity analysis to determine a similarity score between the first customer observable and the second customer observable.

In addition to one or more of the features described herein, the processor applies a first filter to the first term of the first type, the other first terms of the first type, the first term of the second type, the other first terms of the second type, the second term of the first type, the other second terms of the first type, the second term of the second type, and the other second terms of the second type prior to the performing the semantic similarity analysis.

In addition to one or more of the features described herein, the processor forms a first vector that includes the first term of the first type, the other first terms of the first type, the first term of the second type, and the other first terms of the second type, and to form a second vector that includes the second term of the first type, the other second terms of the first type, the second term of the second type, and the other second terms of the second type.

In addition to one or more of the features described herein, the processor forms a first matrix from the first vector and form a second matrix from the second vector.

In addition to one or more of the features described herein, the processor obtains a co-occurrence index value for each of the first term of the first type and the other first terms of the first type with every one of the first term of the second type and the other first terms of the second type, and obtains a co-occurrence index value for each of the second term of the first type and the other second terms of the first types with every one of the second term of the second type and the other second terms of the second type.

In addition to one or more of the features described herein, the processor obtains the co-occurrence index values by performing computations based on occurrences of the first term of the first type, the other first terms of the first type, the first term of the second type, and the other first terms of the second type in the first corpus, and occurrences of the second term of the first type, the other second terms of the first type, the second term of the second type, and the other second terms of the second type in the second corpus.

In addition to one or more of the features described herein, the processor determines a term frequency (tf) and inverse document frequency (idf) of some or all elements of the first vector and some or all elements of the second vector.

In addition to one or more of the features described herein, the processor determines the tf for a term, the term being one of the first term of the first type, the other first terms of the first type, the first term of the second type, the other first terms of the second type, the second term of the first type, the other second terms of the first type, the second term of the second type, or the other second terms of the second type, by determining a total number of mentions of the term in the first corpus based on the term being one of the first term of the first type, the other first terms of the first type, the first term of the second type, or the other first terms of the second type and in the second corpus based on the term being one of the second term of the first type, the other second terms of the first type, the second term of the second type, or the other second terms of the second type, and determines the idf for the term by adding a nominal value to a computation based on a number of documents in which the term is mentioned.

In addition to one or more of the features described herein, the processor determines the similarity score by computing a cosine similarity or computing a Kullback-Leibler (KL) Divergence using a product of the tf and the idf.

In addition to one or more of the features described herein, the first type identifies an automobile part, and the second type identifies a fault symptom.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

The following description is merely exemplary in nature and is not intended to limit the present disclosure, its application or uses.

As previously noted, similar issues (e.g., faults, failures) may be discussed in different forums. For example, a particular model of car may experience issues with the power steering. The issues may be discussed with different verbiage in different forums such as on social media, in technician logs, reports at warranty centers or service centers, vehicle ownership questionnaires, or complaints collected on the National Highway Traffic Safety Administration (NHTSA) website, for example. As a result, pooling all the discussions to determine any similarity and, perhaps, additional discussion of related issues (e.g., issues that seem to precede the power steering issue or other issues that seem to result from the power steering issue) is not straightforward.

Embodiments of the systems and methods detailed herein relate to semantic similarity analysis to link heterogeneous data. The semantic similarity analysis is performed on customer observables or fault signatures extracted from the heterogeneous sources of data. The analysis may identify one of three types of links between two data items: the two data items identify issues that are synonymous, the two data items identify issues that are related but not the same, and the two data items identify issues that are not similar or related. For explanatory purposes, one or more embodiments are detailed with reference to discussions about issues related to vehicles (e.g., automobiles, trucks, construction equipment, farm equipment, automated factory equipment). However, the examples are not intended to limit the methods and systems to any particular application.

Figure 1:
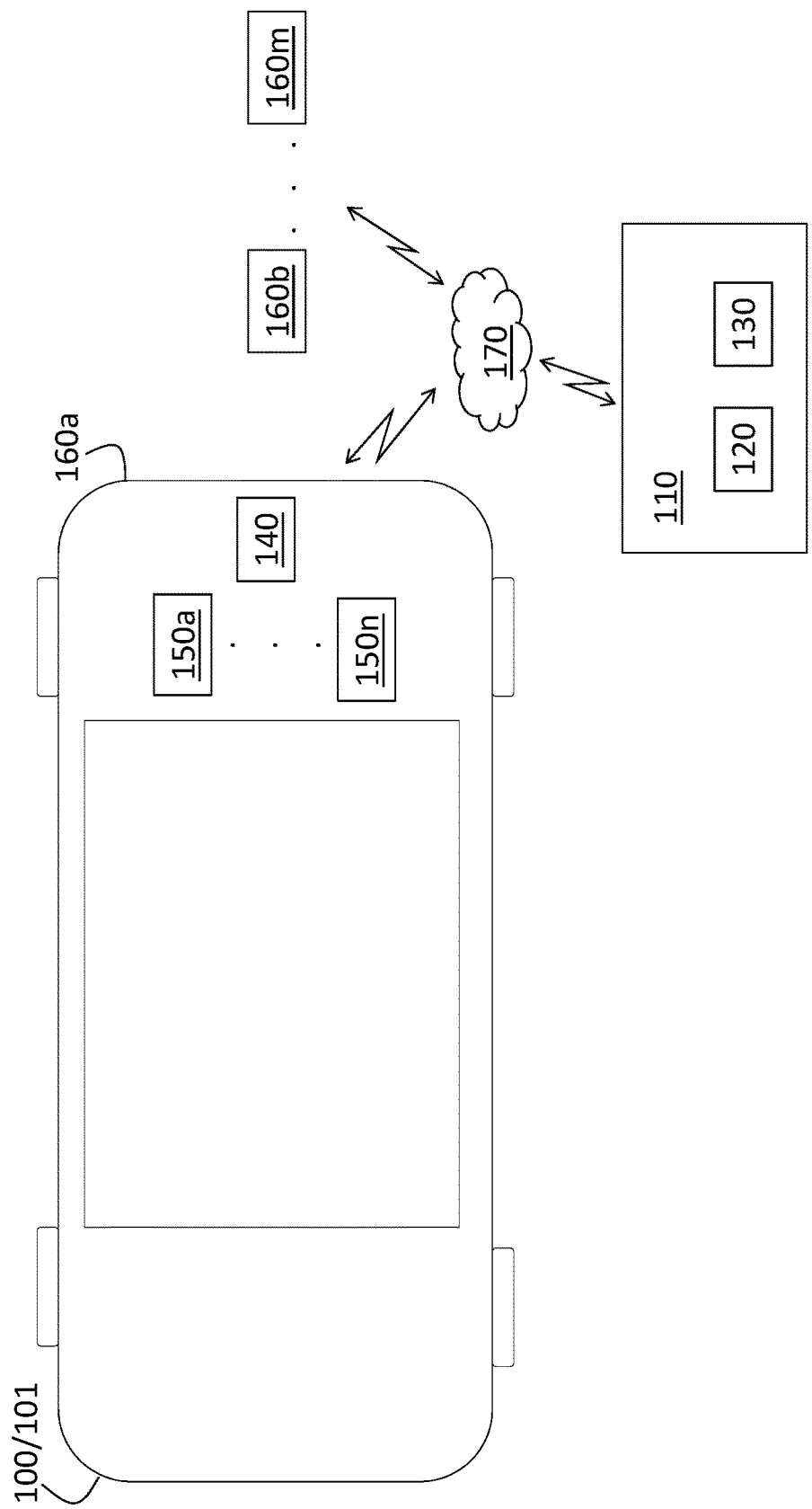
FIG. 1 shows a system to perform semantic similarity analysis according to one or more embodiments.

In accordance with an exemplary embodiment, FIG. 1 shows a system to perform semantic similarity analysis. The exemplary vehicle 100 shown in FIG. 1 is an automobile 101. The vehicle 100 includes a controller 140 that receives information from a number of subsystems 150a through 150n (generally referred to as 150) of the vehicle 100. These subsystems 150 may provide fault codes related to the various components of the automobile 101, for example. The controller 140 communicates information about the subsystems 150, including any fault codes, to a processing system 110. The communication may be direct or may be through a cloud server 170, as shown in FIG. 1.

The processing system 110 may include an application specific integrated circuit (ASIC), an electronic circuit, a processor 120 (shared, dedicated, or group) and memory 130 that executes one or more software or firmware programs, as shown, a combinational logic circuit, and/or other suitable components that provide the described functionality. In addition to communication originating at the vehicle 100, indicated as source 160a, the processing system 110 may receive information from a number of other sources 160b through 160m (generally referred to as 160). These sources 160 may include social media posts that include customer-posted information, industry rating and award organizations that obtain owner survey information, warranty providers with information about repairs provided under the warranty, dealer service providers with information about repairs and fault codes. These sources 160, like the vehicle 100, may communicate directly with the processing system 110 or may provide information via a cloud server 170.

While the exemplary processing system 110 is shown as a stand-alone system in FIG. 1, the processing system 110 may be part of the vehicle 100 or one of the sources 160. For example, the processing system 110 that performs the semantic similarity analysis to link heterogeneous data may be part of a system of a vehicle 100 warranty center that both performs the similarity analysis and collects some of the information used in the analysis. The processing system 110 may be part of a global analysis and reporting tool (GART) of the manufacturer of the vehicle 100 as another example. Based on the result of the semantic similarity analysis to link heterogeneous data, several actions may be taken. The analysis may indicate a link between two issues that was not well-recognized. This link may facilitate better diagnosis or repair of the issue and the related issue. For example, the GART may provide information to service centers regarding the issue and the link to the related issue, in addition to repair guidelines. The analysis may facilitate faster recognition of an issue that requires a recall as another example. When the analysis identifies related issues, the result may facilitate design changes or changes to manufacturing processes.

Figure 2:
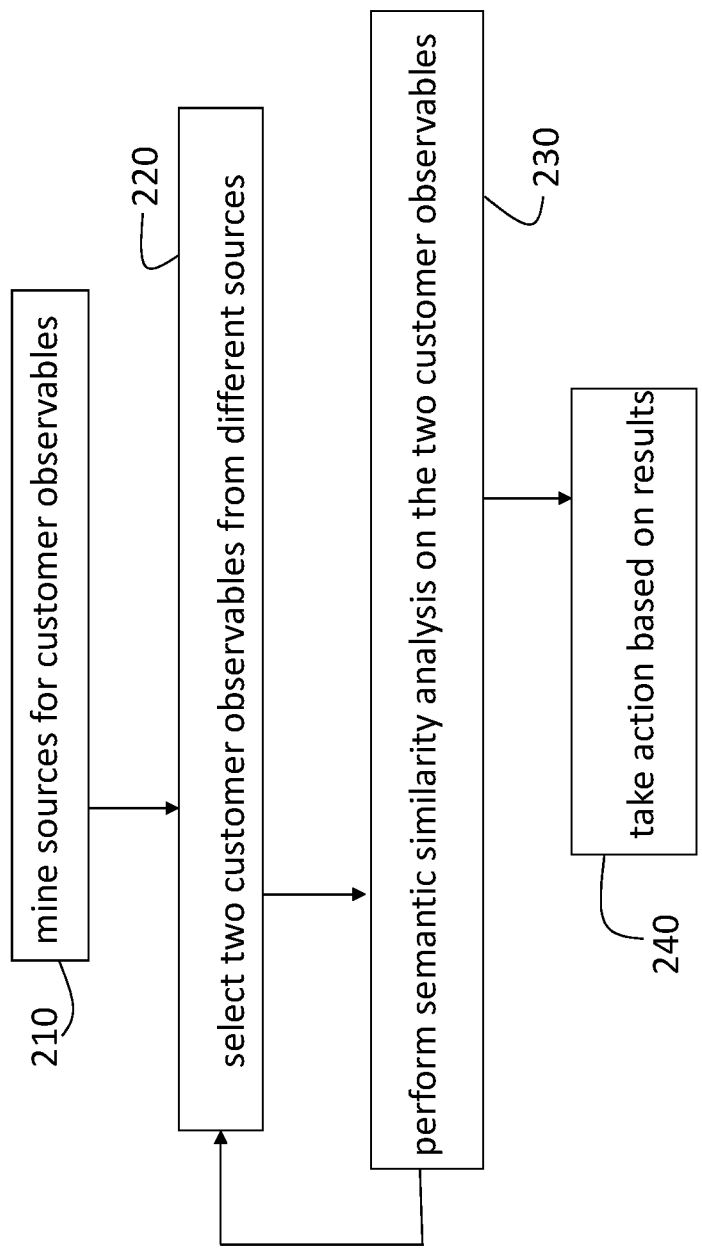
FIG. 2 is a process flow of a method of performing semantic similarity analysis according to one or more embodiments.

FIG. 2 is a process flow of a method of performing semantic similarity analysis according to one or more embodiments. The semantic similarity analysis indicates the similarity between customer observables. In the exemplary context of vehicle issues, each customer observable is made up of two components: a part phrase, which is the first term of the customer observable (referred to as Si), and a symptom phrase, which is the second term of the customer observable (referred to as Sy). An exemplary customer observable is <steering wheel, stiff>. In other areas, the customer observable may be comprised of different components. For example, as part of a consumer research effort related to a commercial product, the customer observable may be comprised of a product and a descriptor.

At block 210, mining sources 160 for customer observables includes performing information extraction natural language processing techniques on the different sources 160 and information from the vehicle 100 (source 160a) to identify customer observables. Different vehicles 100 of the same make or model may be used as sources 160, as well. Based on the purpose of the analysis, the process at block 210 may include selecting two specific sources 160 from which to obtain customer observables of interest. For example, to perform semantic similarity analysis on vehicle issues, customer observables from vehicle ownership questionnaires (VOQs) and from a global analysis reporting tool (GART) that collects warranty data may be obtained as starting points.

At block 220, the processes include selecting two customer observables from two different sources 160. At block 230, performing semantic similarity analysis on the two customer observables (selected at block 220) is according to processes detailed with reference to FIG. 3. As FIG. 2 indicates, the processes at blocks 220 and 230 are performed iteratively, selecting two customer observables per iteration. At block 240, taking action based on the results can include one or more of several actions, and the actions may differ based on the topic of the customer observables. For example, when the customer observables relate to vehicles, as in the explanatory case, the actions include determining a fix for an issue based on the different discussions of similar or related issues and reporting the fix to warranty centers, technicians, and the like. The action may include determining the type of sources 160 in which a given issue is discussed and performing further search accordingly.

As an example, a vehicle owner may report a fault of "vehicle losing power" in a vehicle ownership questionnaire or on the NHTSA website, and this issue may be obtained as a customer observable at block 210. At block 220, this customer observable may be selected along with another customer observable such as "car failed," "vehicle loss of acceleration," "engine control module internal failure," "relay fail," or "fuel tank leak" at block 220 for semantic similarity analysis at block 230. The other customer observables may be obtained from a vehicle manufacturer database, such as GART or from the other NHTSA complaints, for example. The analysis at block 230 may indicate that some customer observables (e.g., "car failed," "vehicle loss of acceleration") are synonymous with "vehicle losing power" while other customer observables (e.g., "relay fail," "fuel tank leak") are related to "vehicle losing power." The identification of the similar issues may provide an indication of whether the vehicle manufacturer knows about the issue identified in different ways. The identification of the related issues may provide information to different stakeholders in the vehicle development lifecycle. For example, design, engineering, and manufacturing teams may use the related issues to determine the root cause and areas for improvement of the next generation design.

Figure 3:
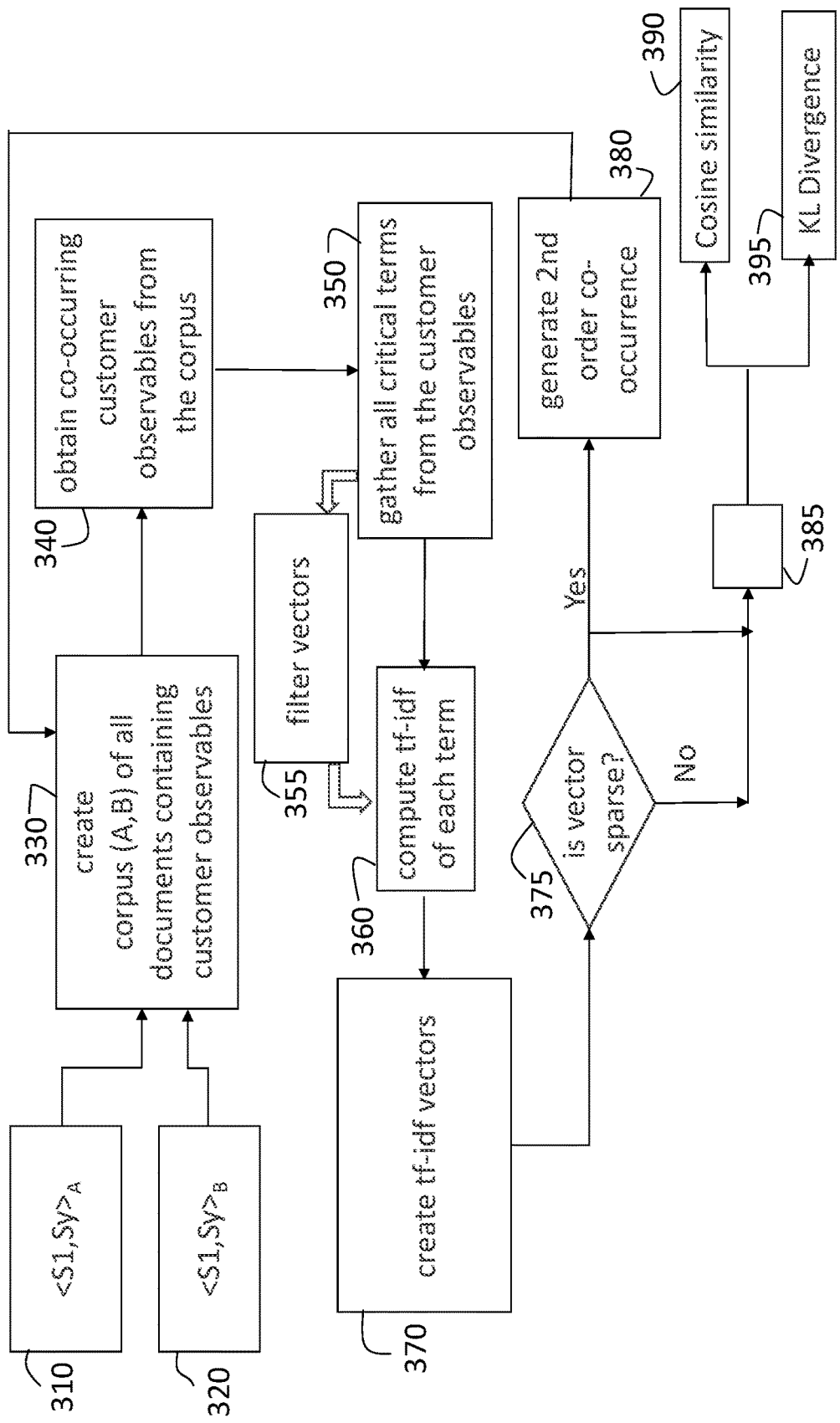
FIG. 3 is a process flow of a method of performing semantic similarity analysis according to one or more embodiments.

FIG. 3 is a process flow of a method of performing semantic similarity analysis (at block 230) according to one or more embodiments. The processes shown in FIG. 3 are performed by the processing system 110. At block 310, the first of two customer observables is indicated as $<S1_A,Sy_A>$, and at block 320, the second of the two customer observables is indicated as $<S1_B, Sy_B>$. As an example, the first customer observable $<S1_A,Sy_A>$ is <steering wheel, stiff>, and the second customer observable $<S1_B, Sy_B>$ is <wheel, hard to turn>. As noted with reference to FIG. 2, these customer observables $<S1_A,Sy_A>$ and $<S1_B, Sy_B>$ may be from a VOQ and GART, for example.

At block 330, creating a corpus of all documents containing the customer observables refers to creating a set (A-docs) of all documents that include customer observable $<S1_A,Sy_A>$ and a set (B-docs) of all documents that include customer observable $<S1_B, Sy_B>$. The documents may be mined from social media, known industry sources 160, and the sources 160 discussed with reference to FIG. 1.

Figure 4:
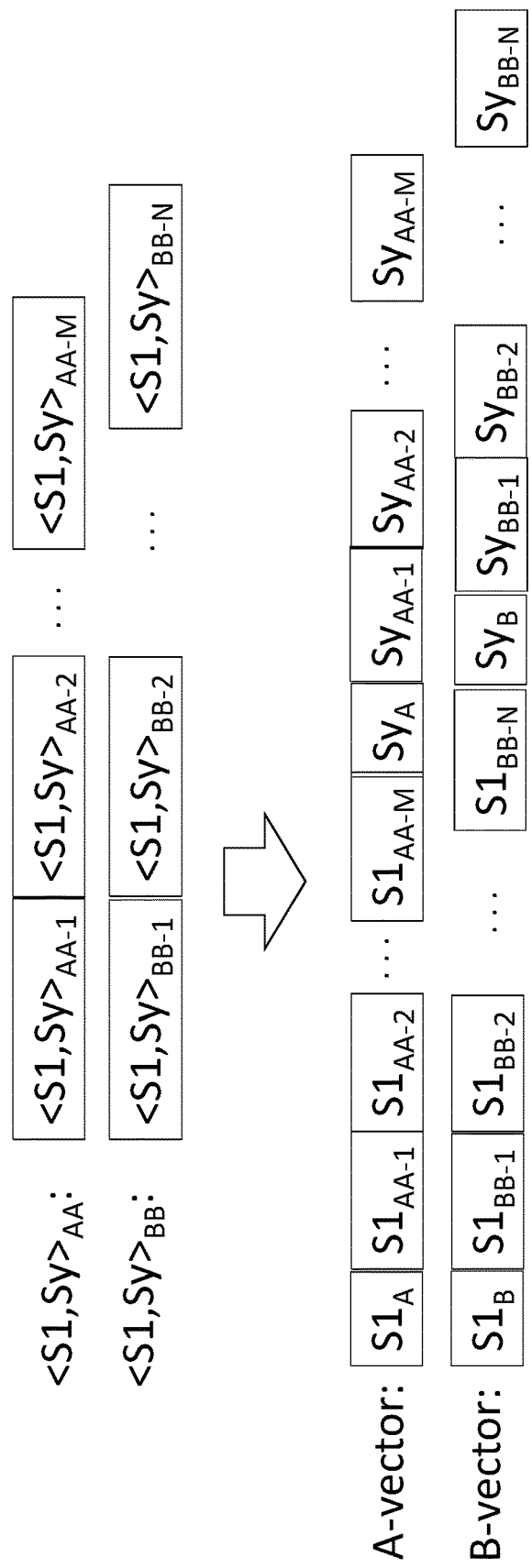
FIG. 4. shows exemplary vectors used in the processes to perform semantic similarity analysis according to one or more embodiments.

Obtaining co-occurring customer observables from the corpus, at block 340, refers to creating two sets of co-occurring customer observables <S1,Sy>$_{AA}$ and <S1,Sy>$_{BB}$. In the documents A-docs, all the customer observables additional to <S1$_A$, Sy$_A$> are obtained as the first set of co-occurring customer observables <S1,Sy>$_{AA}$, and in the documents B-docs, all the customer observables additional to <S1$_B$, Sy$_B$> are obtained as the second set of co-occurring customer observables <S1,Sy>$_{BB}$. For example, if one of the sentences in A-docs were "The steering wheel is stiff and it makes the chassis shake," one of the co-occurring customer observables <S1,Sy>$_{AA}$ would be <chassis, shake>. As another example, if sentences in one of the B-docs were "The wheel is hard to turn. Also, the engine has failed," then a co-occurring customer observable <S1,Sy>$_{BB}$ would be <engine, failed>. FIG. 4 shows exemplary <S1,Sy>$_{AA}$ and <S1,Sy>$_{BB}$. As the example indicates, the two vectors <S1, Sy>$_{AA}$ and <S1,Sy>$_{BB}$ need not be the same length. That is, there may be more co-occurring customer observables <S1, Sy>$_{BB}$ of <S1$_B$, Sy$_B$> than there are co-occurring customer observables <S1,Sy>$_{AA}$ of <S1$_A$, Sy$_A$>, as shown in FIG. 4.

At block 350, gathering all critical terms from the customer observables includes generating two vectors. The first vector A-vector includes S1$_A$ from <S1$_A$, Sy$_A$>, all the S1 from <S1,Sy>$_{AA}$, Sy from <S1$_A$, Sy$_A$>, and all the Sy from <S1,Sy>$_{AA}$. The second vector B-vector includes S1 from <S1$_B$, Sy$_B$>, all the S1 from <S1,Sy>$_{BB}$, Sy from <S1$_B$, Sy$_B$>, and all the Sy from <S1,Sy>$_{BB}$. FIG. 4 also shows an exemplary A-vector and B-vector.

Filtering the vectors A-vector and B-vector, at block 355, is detailed with reference to FIG. 5. Filtering is based on a computation of pointwise mutual information (PMI) for each term. The filtered vectors filteredA and filtereds result from the filtering of A-vector and B-vector. Thus, filteredA and filtereds may look, respectively, like A-vector and B-vector but with some of the terms of the vectors A-vector and B-vector deleted based on their PMI values. Essentially, filtering based on PMI values represents determining a first level or a high level of co-occurrence. Thus, PMI may be considered as a co-occurrence index. Noisy co-occurrence are eliminated based on the filtering at block 355, as detailed with reference to FIG. 5.

Computing tf-idf of each term, at block 360, refers to computing the product of term frequency (tf) and inverse document frequency (idf) for every term in the vectors filtered$_A$ and filtered$_b$. For each term of filtered$_A$ and of filtered$_B$, the term frequency, tf, is a total number of mentions of the term (i.e., sum of the number of times the term is mentioned in each document in which it is mentioned). The idf of each term indicates how narrowly or broadly the term appears. For example, idf for each term (S1 or Sy) may be computed as:

$$0.05 + \log_{10} \frac{total\_documents}{documents\_with\_term} \quad [EQ. 1]$$

In EQ. 1, total_documents is the total number of documents in the corpus. This number is A-docs, when the term (S1 or Sy) for which EQ. 1 is being used is from block 310, or the number is B-docs when the term is from block 320. The documents_with_term is the number of documents within A-docs that include the term (S1 or Sy) for which idf is being calculated when the term is from block 310. The documents_with_term is the number of documents within B-docs that include the term when the term is from block 320. In EQ. 1, the 0.05 may be another nominal value that ensures that idf is not a value of 0. This prevents the tf-idf value (the product of tf and idf) from being 0.

At block 370, creating tf-idf vectors includes creating vectors tf-idf$_A$ and tf-idf$_B$. The vector tf-idf$_A$ may include every term in filtered$_A$ and its associated tf-idf value (computed at block 360), and the vector tf-idf$_B$ may include every term in filtereds and its associated tf-idf value (computed at block 360). In alternate embodiments, the vectors tf-idf$_A$ and tf-idf$_B$ may only include the terms, respectively, from filtered$_A$ and filtered$_B$ that have tf-idf values above a specified threshold (e.g., 0.8). That is, another filtering may be performed at this stage. The threshold tf-idf values (e.g., 0.8 and above) may be different based on the corpus and may be tunable. The vectors tf-idf$_A$ and tf-idf$_B$ are not required to have the same number of terms and would likely not have the same number of terms based on the filtering (at block 355).

At block 375, a check is done on the number of terms in each of the vectors tf-idf$_A$ and tf-idf$_B$. If the number of terms of the vector tf-idf$_A$ or tf-idf$_B$ or both is below a specified threshold number (i.e., the vector is sparse), then generating second-order co-occurrence at block 380 is performed. Generating the second-order co-occurrence, at block 380, includes expanding the corpus created at block 330. For example, if vector tf-idf$_A$ is determined to be too sparse (at block 375), then the corpus of A-docs is expanded to include not only all the documents with the customer observable <S1, Sy>$_A$ but also all the documents with any of the co-occurring customer observables <S1,Sy>$_{AA}$. Then, at block 340, obtaining co-occurring customer observables includes obtaining co-occurring customer observables of all the customer observables <S1,Sy>$_{AA}$ in addition to co-occurring customer observables of customer observable <S1,Sy>$_A$. If vector tf-idf$_B$ is determined to be too sparse (at block 375), then the corpus of B-docs is expanded to include not only all the documents with the customer observable <S1,Sy>$_B$ but also all the documents with any of the co-occurring customer observables <S1,Sy>$_{BB}$. Then, at block 340, obtaining co-occurring customer observables includes obtaining co-occurring customer observables of all the customer observables <S1,Sy>$_{BB}$ in addition to co-occurring customer observables of customer observable <S1,Sy>$_{BB}$. The processes following block 340 are then repeated.

Regardless of the result of the check at block 375, vector similarity is calculated. Prior to calculating similarity, the two vectors tf-idf$_A$ and tf-idf$_B$ are ensured to have the same number of elements k. This is done by padding whichever one of the vectors has fewer elements, as needed, and selecting one of the similarity computations at block 385. Padding the vector that has fewer elements, at block 385, includes adding elements with the tf-idf value 0.05 or some other nominal value. The term associated with the nominal tf-idf value may be a default additional term or may be a repetition of the last term in the vector to which the addition is being made, for example. Selecting one of the similarity computations, at block 385, includes selecting the cosine similarity computation at block 390 or the Kullback-Leibler (KL) Divergence computation at block 395, for example. In alternate or additional embodiments, additional similarity computations (e.g., Jaccard similarity coefficient computation) may be available for selection.

Calculating vector similarity includes computing cosine similarity, at block 390, and computing KL Divergence, at block 395. The cosine similarity is computed, at block 390, as:

$$\text{cosine}(tf-idf_A, tf-idf_B) = \frac{\sum_{i=1}^{k} tf-idf_{Ai} \cdot tf-idf_{Bi}}{\sqrt{tf-idf_{Ai}} \sqrt{tf-idf_{Ai}}} \quad [\text{EQ. 2}]$$

The cosine similarity is computed according to EQ. 2 for every S1 term in A with every Sy term in B and for every Sy term in A with every S1 term in B. This results in a cosine similarity value for every S1 term in A in combination with every Sy term in B and also for every S1 term in B in combination with every Sy term in B. The KL Divergence is computed as:

$$\sum_{i=1}^{k} tf-idf_{Ai} \cdot \log \frac{tf-idf_{Ai}}{\frac{tf-idf_{Ai} + tf-idf_{Bi}}{2}} + \quad [\text{EQ. 3}]$$

$$tf-idf_{Bi} \cdot \log \frac{tf-idf_{Bi}}{\frac{tf-idf_{Ai} + tf-idf_{Bi}}{2}}$$

Like the cosine similarity, KL Divergence is computed for every S1 term in A with every Sy term in B and for every Sy term in A with every S1 term in B. This results in a KL Divergence value for every S1 term in A in combination with every Sy term in B and also for every S1 term in B in combination with every Sy term in B.

Based on the result of EQ. 2 or EQ. 3, a similarity score between the tf-idf$_A$ vector and the tf-idf$_B$ vector is obtained as a value between 0 and 1. The similarity score indicates a similarity between the customer observable <S1$_A$,Sy$_A$> obtained at block 310 and the customer observable <S1$_B$, Sy$_B$> obtained at block 320. The value may indicate whether the two customer observables are similar (i.e., synonymous) (e.g., value greater than 0.85), related (e.g., value between 0.5 and 0.85), or unrelated (e.g., value below 0.5). The analysis discussed above may be performed iteratively on a periodic or event-based basis. For example, at each iteration, similarity of the customer observable <S1$_A$,Sy$_A$> at block 310 with different customer observables at block 320 may be determined. Also, as the corpus grows (i.e., new customer observables are added), the relationship indicated among previously analyzed customer observables may change.

Figure 5:
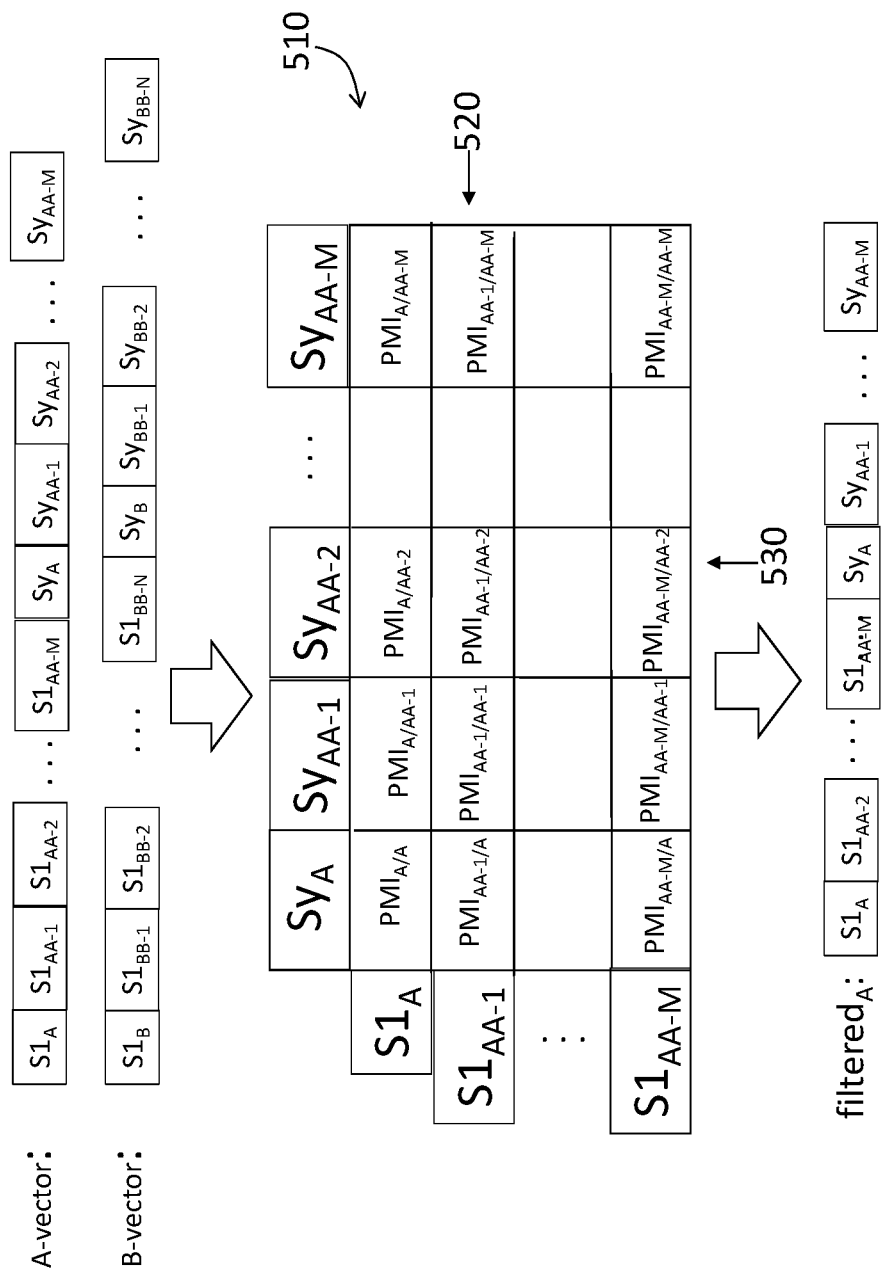
FIG. 5 shows an exemplary matrix used to apply a first filter in the semantic similarity analysis according to one or more embodiments.

FIG. 5 illustrates steps involved in obtaining filtered vectors filteredA and filtereds from A-vector and B-vector at block 355 (FIG. 3) according to an exemplary embodiment. While exemplary A-vector and B-vector are shown, only the PMI matrix 510 obtained from A-vector and the resulting exemplary filteredA vector are shown in FIG. 5 for explanatory purposes. As the PMI matrix 510 indicates, a PMI value is computed for every S1 term in A-vector in association with every Sy term in A-vector. The PMI value for a given S1 and Sy is given by:

$$PMI(S1, Sy) = Pr(S1, Sy) \log_2 \frac{Pr(S1, Sy)N}{Pr(S1)Pr(sy)} \quad [\text{EQ. 4}]$$

In EQ. 4, Pr refers to the probability.

$$Pr(S1, Sy) = \frac{\#\_\text{co-occurrences}}{\text{total\_customer\_observables}} \quad [\text{EQ. 5}]$$

In EQ. 5, #_co-occurrences refers to the number of documents in A-docs in which both S1 and Sy appear, and total_customer_observables refers to the total number of (S1,Sy) combinations, which is the number of elements of the PMI matrix 510.

$$Pr(S1) = \frac{\#\_\text{occurrences}}{\text{total\_S1}} \quad [\text{EQ. 6}]$$

In EQ. 6, #_occurrences refers to the number of times S1 appears in A-docs, and total_S1 refers to the number of S1 terms in A-vector.

$$Pr(Sy) = \frac{\#\_\text{occurrences}}{\text{total\_Sy}} \quad [\text{EQ. 7}]$$

In EQ. 7, #_occurrences refers to the number of times Sy appears in A-docs, and total_Sy refers to the number of Sy terms in A-vector.

Filtering based on the PMI value refers to determining a threshold PMI value that must be exceeded. If every PMI value associated with a given S1 or Sy is below the threshold, then that S1 or Sy is filtered out. For example, if PMI$_{A/A}$ is below the threshold but PMI$_{A/AA-1}$ above the threshold, then S1$_A$ would not be filtered out. However, if, for example, every PMI value in row 520 (e.g., PMI$_{AA-1/A}$, PMI$_{AA-1/AA-1}$, PMI$_{AA-1/AA-2}$, ..., PMI$_{AA-1/AA-M}$) were below the threshold, then S1$_{AA-1}$ would be eliminated from the filtered$_A$ vector, as shown in FIG. 5. Also, if every PMI value in the column 530 (e.g., PMI$_{A/AA-2}$, PMI$_{AA-1/AA-2}$, ..., PMI$_{AA-M/AA-2}$) were below the threshold, then Sy$_{AA-2}$ would be eliminated from the filtered vector, as is the case in the example shown in FIG. 5.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A method of determining relatedness of heterogeneous data, the method comprising:
    selecting a first customer observable from a first source document, the first customer observable being made up of two terms, the two terms being a first term of a first type and a first term of a second type;
    selecting a second customer observable from a second source document, the second customer observable being made up of a second term of the first type and a second term of the second type;
    creating a first corpus of all documents that include the first term of the first type and the first term of the second type;
    creating a second corpus of all documents that include the second term of the first type and the second term of the second type;
    obtaining other first terms of the first type and other first terms of the second type in the first corpus and other second terms of the first type and other second terms of the second type in the second corpus; and performing semantic similarity analysis using the first term of the first type, the other first terms of the first type, the second term of the first type, and the other second terms of the first type and the first term of the second type, the other first terms of the second type, the second term of the second type, and the other second terms of the second type to determine a similarity score between the first customer observable and the second customer observable.

2. The method according to claim 1, further comprising applying a first filter to the first term of the first type, the other first terms of the first type, the first term of the second type, the other first terms of the second type, the second term of the first type, the other second terms of the first type, the second term of the second type, and the other second terms of the second type prior to the performing the semantic similarity analysis.

3. The method according to claim 1, further comprising forming a first vector that includes the first term of the first type, the other first terms of the first type, the first term of the second type, and the other first terms of the second type, and forming a second vector that includes the second term of the first type, the other second terms of the first type, the second term of the second type, and the other second terms of the second type.

4. The method according to claim 3, further comprising forming a first matrix from the first vector and forming a second matrix from the second vector.

5. The method according to claim 3, further comprising obtaining a co-occurrence index value for each of the first term of the first type and the other first terms of the first type with every one of the first term of the second type and the other first terms of the second type, and obtaining a co-occurrence index value for each of the second term of the first type and the other second terms of the first types with every one of the second term of the second type and the other second terms of the second type.

6. The method according to claim 5, wherein the obtaining the co-occurrence index values includes performing computations based on occurrences of the first term of the first type, the other first terms of the first type, the first term of the second type, and the other first terms of the second type in the first corpus, and occurrences of the second term of the first type, the other second terms of the first type, the second term of the second type, and the other second terms of the second type in the second corpus.

7. The method according to claim 3, further comprising determining a term frequency (tf) and inverse document frequency (idf) of some or all elements of the first vector and some or all elements of the second vector.

8. The method according to claim 7, wherein the determining the tf for a term, the term being one of the first term of the first type, the other first terms of the first type, the first term of the second type, the other first terms of the second type, the second term of the first type, the other second terms of the first type, the second term of the second type, or the other second terms of the second type, includes determining a total number of mentions of the term in the first corpus based on the term being one of the first term of the first type, the other first terms of the first type, the first term of the second type, or the other first terms of the second type and in the second corpus based on the term being one of the second term of the first type, the other second terms of the first type, the second term of the second type, or the other second terms of the second type, and the determining the idf for the term includes adding a nominal value to a computation based on a number of documents in which the term is mentioned.

9. The method according to claim 7, further comprising determining the similarity score includes computing a cosine similarity or computing a Kullback-Leibler (KL) Divergence using a product of the tf and the idf.

10. The method according to claim 1, wherein the determining the relatedness is performed iteratively by selecting a different second customer observable in each iteration.

11. A system to determine relatedness of heterogeneous data, the system comprising:

a memory device configured to store a first corpus of all documents that include a first term of a first type and a first term of a second type and to store a second corpus of all documents that include a second term of the first type and a second term of the second type, wherein the first term of the first type and the first term of the second type comprise a first customer observable, and the second term of the first type and the second term of the second type comprise a second customer observable; and a processor configured to identify other first terms of the first type and other first terms of the second type in the first corpus, identify other second terms of the first type and other second terms of the second type in the second corpus, and perform semantic similarity analysis to determine a similarity score between the first customer observable and the second customer observable.

12. The system according to claim 11, wherein the processor is further configured to apply a first filter to the first term of the first type, the other first terms of the first type, the first term of the second type, the other first terms of the second type, the second term of the first type, the other second terms of the first type, the second term of the second type, and the other second terms of the second type prior to the performing the semantic similarity analysis.

13. The system according to claim 11, wherein the processor is further configured to form a first vector that includes the first term of the first type, the other first terms of the first type, the first term of the second type, and the other first terms of the second type, and to form a second vector that includes the second term of the first type, the other second terms of the first type, the second term of the second type, and the other second terms of the second type.

14. The system according to claim 13, wherein the processor is further configured to form a first matrix from the first vector and form a second matrix from the second vector.

15. The system according to claim 13, wherein the processor is further configured to obtain a co-occurrence index value for each of the first term of the first type and the other first terms of the first type with every one of the first term of the second type and the other first terms of the second type, and obtain a co-occurrence index value for each of the second term of the first type and the other second terms of the first types with every one of the second term of the second type and the other second terms of the second type.

16. The system according to claim 15, wherein the processor is further configured to obtain the co-occurrence index values by performing computations based on occurrences of the first term of the first type, the other first terms of the first type, the first term of the second type, and the other first terms of the second type in the first corpus, and occurrences of the second term of the first type, the other second terms of the first type, the second term of the second type, and the other second terms of the second type in the second corpus.

17. The system according to claim 13, wherein the processor is further configured to determine a term frequency (tf) and inverse document frequency (idf) of some or all elements of the first vector and some or all elements of the second vector.

18. The system according to claim 17, wherein the processor is further configured to determine the tf for a term, the term being one of the first term of the first type, the other first terms of the first type, the first term of the second type, the other first terms of the second type, the second term of the first type, the other second terms of the first type, the second term of the second type, or the other second terms of the second type, by determining a total number of mentions of the term in the first corpus based on the term being one of the first term of the first type, the other first terms of the first type, the first term of the second type, or the other first terms of the second type and in the second corpus based on the term being one of the second term of the first type, the other second terms of the first type, the second term of the second type, or the other second terms of the second type, and to determine the idf for the term by adding a nominal value to a computation based on a number of documents in which the term is mentioned.

19. The system according to claim 17, wherein the processor is further configured to determine the similarity score by computing a cosine similarity or computing a Kullback-Leibler (KL) Divergence using a product of the tf and the idf.

20. The system according to claim 11, wherein the first type identifies an automobile part, and the second type identifies a fault symptom.

* * * * *